US008904813B2

(12) United States Patent
Lifson et al.

(10) Patent No.: US 8,904,813 B2
(45) Date of Patent: Dec. 9, 2014

(54) PULSE WIDTH MODULATED SYSTEM WITH PRESSURE REGULATING VALVE

(75) Inventors: Alexander Lifson, Manlius, NY (US); Michael F. Taras, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 1832 days.

(21) Appl. No.: 12/088,873

(22) PCT Filed: Nov. 30, 2005

(86) PCT No.: PCT/US2005/043626
§ 371 (c)(1),
(2), (4) Date: Apr. 1, 2008

(87) PCT Pub. No.: WO2007/064328
PCT Pub. Date: Jun. 7, 2007

(65) Prior Publication Data
US 2008/0250801 A1    Oct. 16, 2008

(51) Int. Cl.
| F25B 41/04 | (2006.01) |
| G05D 16/20 | (2006.01) |
| F04C 23/00 | (2006.01) |
| F04C 28/24 | (2006.01) |
| F04C 18/02 | (2006.01) |
| F04B 49/22 | (2006.01) |

(52) U.S. Cl.
CPC .......... *F25B 41/043* (2013.01); *G05D 16/2013* (2013.01); *F25B 2600/2519* (2013.01); *F04C 23/008* (2013.01); *F04C 28/24* (2013.01); *F04C 18/0207* (2013.01); *F04B 49/225* (2013.01)
USPC ........................................... 62/217; 62/196.1

(58) Field of Classification Search
USPC .......................... 62/225, 228.3, 217; 417/310
See application file for complete search history.

(56) References Cited

U.S. PATENT DOCUMENTS

| 3,365,905 | A | * | 1/1968 | Barbier ........................ 62/196.1 |
| 5,226,472 | A |   | 7/1993 | Benevelli |
| 5,236,311 | A | * | 8/1993 | Lindstrom .................... 417/254 |
| 6,047,556 | A |   | 4/2000 | Lifson |
| 6,206,652 | B1 |   | 3/2001 | Caillat |
| 6,357,242 | B1 | * | 3/2002 | Farley et al. ................... 62/133 |

(Continued)

FOREIGN PATENT DOCUMENTS

| JP | 11182946 A | 7/1999 |
| JP | 11248261 A | 9/1999 |

OTHER PUBLICATIONS

Search Report PCT/US05/43626.

(Continued)

Primary Examiner — Cassey D Bauer
(74) Attorney, Agent, or Firm — Carlson, Gaskey & Olds, PC

(57) ABSTRACT

A pulse width modulation control is provided for a suction valve on a suction line, delivering refrigerant into a housing shell of a compressor. When the suction valve is closed, the pressure within the housing shell can become very low. Thus, a pressure regulator valve is included within the refrigerant system to selectively deliver a limited amount of refrigerant into the housing shell when the suction valve is closed. The delivery of this limited amount of refrigerant ensures that a specified pressure is maintained within the housing shell to achieve the most efficient operation while at the same time preventing problems associated with damage to electrical terminals, motor overheating and excessive discharge temperature.

14 Claims, 1 Drawing Sheet

(56) References Cited

U.S. PATENT DOCUMENTS

| | | |
|---|---|---|
| 6,449,972 B2 | 9/2002 | Pham et al. |
| 6,931,867 B2 | 8/2005 | Healy et al. |
| 2010/0043468 A1* | 2/2010 | Lifson et al. ............ 62/196.3 |
| 2010/0064702 A1* | 3/2010 | Lifson et al. ............ 62/115 |

OTHER PUBLICATIONS

International Preliminary Report on Patentability dated Jun. 12, 2008.

Supplementary European Search Report, dated Jun. 23, 2010.

* cited by examiner

PULSE WIDTH MODULATED SYSTEM WITH PRESSURE REGULATING VALVE

BACKGROUND OF THE INVENTION

This application relates to a control for a refrigerant system wherein pulse width modulation technologies are utilized to provide further control over the system operation and wherein a control over a suction pressure is desired when the pulse width modulating valve is in a closed position.

Various operational features are known for providing adjustments in refrigerant system capacity. One approach, which has been utilized in the prior art to change the capacity of a refrigerant system, is the use of pulse width modulation to control valves such as a shutoff valve on a compressor suction line. By rapidly cycling these valves utilizing pulse width modulation techniques, additional capacity control is provided. A system with a pulse width modulating valve will perform most efficiently (in other words, the compressor will consume less power for the same delivered capacity) if the pressure inside the compressor shell within the suction region is reduced to the lowest possible value.

One challenge with regard to utilizing pulse width modulation control for a suction valve and reducing the pressure to the lowest possible value for the purpose of increasing operational efficiency is that, when the suction valve is closed to reduce capacity, the pressure within a compressor shell may drop to be effectively near complete vacuum. It is undesirable to have a pressure below a minimum predetermined pressure in the compressor shell, as this may sometimes lead to an undesirable condition called "corona discharge." Also, the motor can overheat causing the discharge temperature to be above the specified safe limit. A corona discharge can occur over the electrical terminals, and may lead to a deterioration of the terminals, and compressor failure. This minimum pressure is typically around 0.5 psia.

In the past, this problem has been addressed by having a leaky pulse width modulating valve (for example, the valve with a small opening in its stem) or the bypass loop has been installed around the pulse width modulating valve. The small opening through the leaky pulse width modulating valve or the small opening in the bypass line was sized to maintain the pressure in the compressor suction compartment above a certain value. However, due to changing operating conditions, the size of this opening needed to be designed to assure that the pressure would not drop below a certain level for all operating conditions. Since the pressure needed to be above a minimum value for all operating conditions, this led to a situation where for some operating condition, the compressor was operating at suction pressures that were well above the minimum acceptable limit. This in turn led to lower system efficiency, because now the pressure was too high to assure the efficient operation at such "off-design" conditions. Thus, the need exists to adjust the suction pressure to be just above the minimum acceptable level for all operating conditions. In other words, in the prior art, the pressure could not be controlled to the minimum acceptable level for all operating conditions, causing the pressure to be higher than desired for some of the operating conditions, that led to lower efficiency in these instances. Thus, it would be desirable to maintain the pressure at the lowest possible level for all the operating conditions, when a suction valve is pulse width modulated to a closed position.

SUMMARY OF THE INVENTION

In the disclosed embodiment of this invention, a compressor is associated with a refrigerant system. The refrigerant system has a valve on a suction line leading to the compressor, and a pulse width modulation control is provided for that suction valve. The pulse width modulation control is operable to rapidly cycle the valve between opened and closed positions (states) to change the capacity of the refrigerant system by controlling the amount of refrigerant delivered to the compressor. To increase the efficiency of the system in the pulse width modulation mode it is desirable to have the pressure at the compressor suction to be as low as possible when the valve is in a closed position. However, if the pressure within the compressor shell drops below a certain level, then corona discharge effect may take place leading to a compressor failure. Also, under certain situations, if the suction pressure would drop below a certain value, motor overheating and excessive discharge temperatures may occur damaging the compressor. Thus, the compressor designer's goal is to optimize the system operation such that the suction pressure is maintained as low as possible when the valve is in a closed position but still above the level that prevents these detrimental effects. Further, the compressor designer's objective is to design the system such that for all operating conditions the compressor shell pressure is just above (with some safety margin) the lowest predetermined limit. In the past, the compressor designer could not control this pressure to be just above this lowest pressure limit for all operating conditions. For some of the operating conditions, the pressure was well above the lowest acceptable pressure leading to inefficient operation.

The present invention addresses this concern by providing a pressure regulating valve, which opens when very low pressures are sensed to allow for a limited amount of refrigerant flow into the compressor shell to maintain the pressure inside the compressor shell at a certain level that is acceptable to prevent the compressor damage while assuring the most efficient operation. The pressure regulating valve would maintain this pressure at the same lowest level regardless of the operating conditions when the pulse width modulating valve is in the closed position. Thus, the pressure regulating valve may be designed to maintain this minimum pressure (with a safety margin), of at least say one psia, in the suction region of the compressor shell. In this way, the corona discharge effect and other undesirable effects mentioned above, as found in the prior art, when the suction modulation valve is closed, are not experienced with the present invention while at the same time the compressor runs most efficiently at all operating conditions.

The pressure regulating valve in the present invention is installed in parallel with the pulse width modulating valve. Therefore, when the pulse width modulating valve is in the closed position, all (or almost all) the flow passes through the pressure regulating valve and the pressure regulating valve opens just enough to maintain the pressure in the compressor just above the minimum predetermined limit, regardless of the operating conditions (such as mass flow through this valve, pressure and temperature upstream of this valve, and temperature downstream of this valve). When the suction pulse width modulating valve is in the open position, the flow through the pressure regulating valve is small in comparison with the flow through the pulse width modulating valve, and thus the pressure regulating valve opening does not change the operation of the system. As indicated above, in the disclosed embodiment the pressure regulating valve is mounted on a flow line which bypasses the suction pulse width modulating valve, to provide a limited amount of refrigerant flow into the compressor shell when the suction valve is in the closed position.

Although, for illustrative purposes, this invention is described in relation to refrigerant systems incorporating scroll compressors, it is applicable to any compressor (for example, screw, rotary or reciprocating compressors) whose performance may be affected by operation below a certain suction pressure within its shell.

These and other features of the present invention can be best understood from the following specification and drawings, the following of which is a brief description.

DETAILED DESCRIPTION OF THE PREFERRED EMBODIMENT

Figures 1, 2:
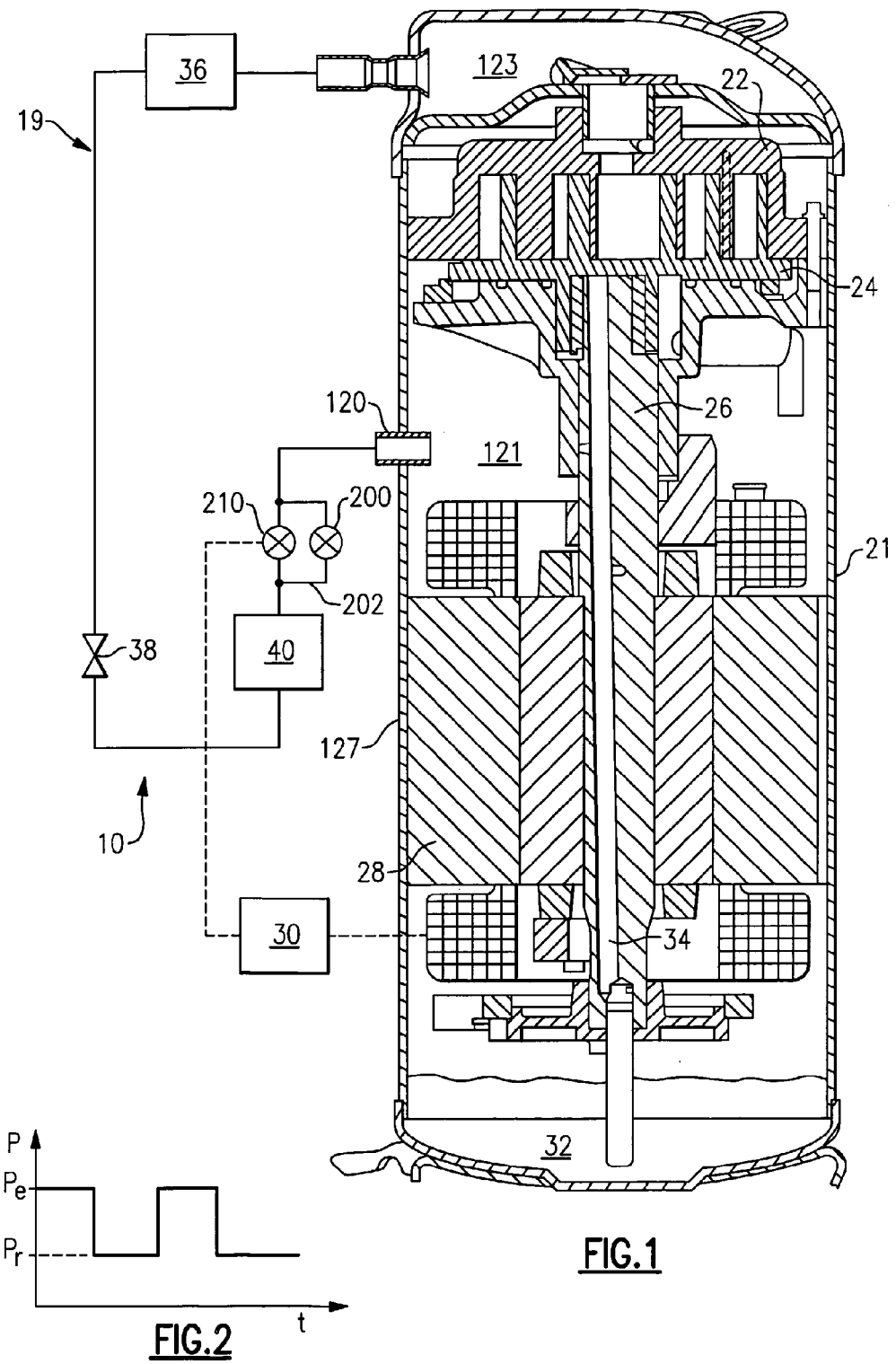
FIG. 1 is a schematic view of a refrigerant system incorporating the present invention.
FIG. 2 shows a pressure versus time graph in the compressor suction chamber when the pressure regulating valve is cycled from an open to closed position, with the lower pressure ($P_r$) being maintained to be near a predetermined lowest pressure setting, regardless of the operating conditions.

A refrigerant system 19 is illustrated in FIG. 1 having a scroll compressor 21 incorporating a non-orbiting scroll member 22 and an orbiting scroll member 24. As is known, shaft 26 is driven by an electric motor 28 to cause the orbiting scroll member 24 to orbit. As shown, a control 30 is schematically connected to drive the electric motor 28. An oil sump 32 and an oil passage 34 in the shaft 26 supply oil to the various moving elements in the compressor 21, as known.

A condenser 36 is positioned downstream of the compressor 21, an expansion device 38 is located downstream of the condenser 36, and an evaporator 40 is positioned downstream of the expansion device 38, as known. As is also known, the compressor 21 is driven by the electric motor 28 to compress a refrigerant and to circulate it through the refrigerant system 19.

The control 30 may be a microprocessor or other type control that is capable of providing pulse width modulation control to a suction modulation valve 210. It should be understood that the control 30 includes a program that takes in inputs from various locations within the refrigerant system (not shown), and determines when the pulse width modulation of the suction modulation valve 210 needs to be initiated. Controls capable of performing this function with such valves are known.

When the control 30 determines that it would be desirable to reduce capacity, the valve 210 is moved to a pulse width modulation control to be rapidly opened and closed. When the valve 210 is closed, the amount of refrigerant flowing into a suction tube 120 leading into an interior chamber 121 in the compressor shell 127 is limited such that the pressure within the chamber 121 may approach complete vacuum, as the compressor will be pumping all the refrigerant out of the interior chamber 121 and then into the condenser 36. Because the suction line is blocked by the valve 210, no refrigerant will return to the compressor 21, thus pulling the pressure in the chamber 121 close to complete vacuum. As mentioned above, the terminals on the electric motor 28 are subject to damage from the corona discharge at very low pressures. The extremely low pressure at the chamber 121 can also lead to motor overheating, as the amount of the refrigerant passing over the motor, to cool the motor, will be very limited. Also, the discharge temperature can reach an unacceptably high value, if the suction pressure drops below a certain predetermined value. Thus, the present invention provides a pressure regulating valve 200 on a bypass line 202 around the suction modulation valve 210. Now, when the suction modulation valve 210 is closed the pressure in the suction tube 120, and within the chamber 121, will drop toward 0 psia. However, the pressure regulating valve 200 will then open allowing a very limited amount of refrigerant flow into the chamber 121. Preferably, the pressure regulating valve 200 and the bypass line 202 are designed such that a minimum pressure of approximately 1 psia is maintained within the chamber 121 when the valve 210 is closed. Valves that open at a particular pressure are known and may be used. As is clear, the bypass line 202 communicates with the suction line downstream of the evaporator 40.

In the prior art, a small opening through the valve 200 or the bypass line has been provided, always permitting a small amount of refrigerant to pass through the valve. However, the use of this small opening, while sized to provide the pressure in the chamber 121 to be above a certain value, has one major drawback as described above, since a compressor designer will lose the ability to control the pressure within the compartment 121 in the narrow band of the pressure values near 1 psi. For the case of the fixed opening, the pressure within compartment 121 can be much higher than 1 psi for certain operating conditions when the pulse width modulating valve 210 is in a closed position, which is undesirable. On the other hand, the pressure regulating valve would always maintain the pressure in the chamber 121 near 1 psi (or minimum preset pressure value for a given pressure regulating valve). Maintaining pressure near 1 psia in the chamber 121, when the pulse width modulating valve is closed, is advantageous as it can achieve better operating efficiency of the compressor and refrigerant system.

It should be understood that other settings rather then 1 psia could be selected for a pressure regulating valve. For example, some compressor designs may call for an optimum setting of 0.5 psia while other compressor designs may call for a setting near 2 psia. A designer would understand how to achieve the above goals with an appropriate structure. Thus, the pressure regulating valve maintains a pressure between 0.5 psia and 2.0 psia.

On the other hand, when the valve 210 is opened, the amount of refrigerant flowing through the suction modulation valve 210 is so much greater than the refrigerant amount which would pass through the pressure regulating valve 200, that the flow passing through pressure regulating valve 200 and bypass line 202 become effectively inconsequential, when compared to the amount of the refrigerant flow passing through the pulse width modulating valve 210, when this valve is in the open position.

As is known, the housing shell of the compressor 21 is sealed such that there is a suction pressure in the chamber 121, and a discharge pressure in the chamber 123, after the refrigerant is compressed between the compressor scroll members 22 and 24. As is also known, refrigerant passes to the suction chamber 121 from the suction line 120, and into compression chambers defined between the scroll members 22 and 24.

The present invention thus provides a manner of easily and effectively dealing with unduly low pressures within a chamber 121 when a suction valve is pulse width modulated.

It should be understood that although this invention is described in relation to refrigerant systems incorporating any scroll compressors, it is applicable to other compressor types such as screw compressors, reciprocating compressors, rotary compressors, etc. This invention is also applicable to a broad range of refrigerant systems including commercial rooftop system, chillers, residential air conditioning and heat pump systems, refrigeration container units installed on board of ships and used fop transportation of goods on land, refrigeration truck-trailer systems, commercial refrigeration units and the like.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A refrigerant system comprising:
a compressor, said compressor confined within a housing shell;
a condenser downstream of said compressor, an expansion device downstream of said condenser, and an evaporator downstream of said expansion device;
a pulse width modulation control for opening and closing a suction valve on a suction line leading from said evaporator into said housing shell;
a flow structure to allow limited flow of a refrigerant into said housing shell when said suction valve is closed, and a pressure regulating valve controlling said limited flow;
said pressure regulating valve delivering refrigerant from said suction line into said housing shell;
said pressure regulating valve mounted on a bypass line which bypasses said suction valve; and
said pressure regulating valve and said bypass line being designed to maintain a pressure of less than 2 psia in said housing shell when said suction valve is closed.

2. The refrigerant system as set forth in claim 1, wherein said pressure regulating valve and said bypass line are designed to maintain a pressure of approximately 1 psia in said housing shell when said suction valve is closed.

3. The refrigerant system as set forth in claim 1, wherein said compressor is selected from the group consisting of a scroll compressor, a rotary compressor, a reciprocating compressor, and a screw compressor.

4. The refrigerant system as set forth in claim 1, wherein said system is selected from a group of consisting of a commercial rooftop system, chiller system, residential air conditioning or heat pump system, refrigeration container system, refrigeration truck-trailer system, and commercial refrigeration system.

5. The refrigerant system as set forth in claim 1, wherein said compressor is hermetically sealed.

6. The refrigerant system as set forth in claim 1, wherein said flow structure is designed to ensure that a pressure of between 0.5 and 2.0 psia is maintained within said housing shell when said suction valve is closed.

7. A refrigerant system comprising:
a compressor, said compressor confined within a housing shell;
a condenser downstream of said compressor, an expansion device downstream of said condenser, and an evaporator downstream of said expansion device;
a pulse width modulation control for opening and closing a suction valve on a suction line leading from said evaporator into said housing shell;
a flow structure to allow limited flow of a refrigerant into said housing shell when said suction valve is closed, and a pressure regulating valve controlling said limited flow;
said compressor being driven by an electric motor with the flow of refrigerant into the housing shell being into a chamber that receives the electric motor.

8. A method of operating a refrigerant system comprising the steps of:
(1) providing a compressor with a housing shell and receiving refrigerant from a suction line;
(2) providing pulse width modulation control for a suction valve on said suction line to allow the variation of capacity of the refrigerant system by opening and closing said suction valve;
(3) providing a flow structure for delivering a limited amount of refrigerant into said housing shell when said suction valve is closed, said flow structure including a pressure regulating valve; and
(4) designing said pressure regulating valve and said bypass line to maintain a pressure of less than 2 psia in said housing shell when said suction valve is closed.

9. The method as set forth in claim 8, wherein said pressure regulating valve controls flow from said suction line into said housing shell.

10. The method as set forth in claim 9, wherein said pressure regulating valve is mounted on a bypass line which bypasses said suction valve.

11. The method as set forth in claim 8, wherein said pressure regulating valve and said bypass line are designed to maintain a pressure of approximately 1 psia in said housing shell when said suction valve is closed.

12. The method as set forth in claim 8, wherein said compressor is driven by an electric motor with the flow of refrigerant into the housing shell being into a chamber that receives the electric motor.

13. The method as set forth in claim 8, wherein said housing shell is hermetically sealed.

14. The method as set forth in claim 8, wherein said flow structure is designed to ensure that a pressure of between 0.5 and 2.0 psia is maintained within said housing shell when said suction valve is closed.

* * * * *